United States Patent [19]

Henk et al.

[11] 3,903,060

[45] Sept. 2, 1975

[54] ALPHA-METHYL STYRENE/TERTIARY BUTYL STYRENE/OLEFIN TEREPOLYMER RESINS AND HOT MELT ADHESIVES CONTAINING THE SAME

[75] Inventors: Michael G. Henk, Wheaton; Gary P. Sartler, Downers Grove, both of Ill.

[73] Assignee: The Standard Oil Company, Chicago, Ill.

[22] Filed: Nov. 23, 1973

[21] Appl. No.: 418,563

[52] U.S. Cl.......... 260/80.78; 260/88.2 C; 260/84.1
[51] Int. Cl...... C08f 15/04; C08f 19/06; C08d 3/02
[58] Field of Search..................... 260/80.78, 88.2 C

[56] References Cited
UNITED STATES PATENTS

| | | | |
|---|---|---|---|
| 3,622,551 | 11/1971 | Davis | 260/84.1 |
| 3,642,636 | 2/1972 | Bacskai | 252/59 |
| 3,654,250 | 4/1972 | Davis | 260/88.2 C |

*Primary Examiner*—Joseph L. Schofer
*Assistant Examiner*—A. L. Clingman
*Attorney, Agent, or Firm*—Wallace L. Oliver; Arthur G. Gilkes; William T. McClain

[57] ABSTRACT

New polymeric resin compositions are prepared by copolymerizing alpha-methylstyrene, tertiary butylstyrene and an olefin e.g., isoprene and 2-methyl-2-butene. Such resins are useful as hot melt adhesives.

9 Claims, No Drawings

ALPHA-METHYL STYRENE/TERTIARY BUTYL STYRENE/OLEFIN TEREPOLYMER RESINS AND HOT MELT ADHESIVES CONTAINING THE SAME

BACKGROUND OF THE INVENTION

The field of this invention relates to new polymeric resins and to the use of the resins in hot melt adhesives. The resins are related to but different from resins based on alpha-methylstyrene such as those shown in Eihel et al. U.S. Pat. No. 3,401,132 (1968), Mase et al. U.S. Pat. No. 3,401,131 (1969), Arnold et al. U.S. Pat. No. 3,429,843 (1969), Arnold et al. U.S. Pat. No. 3,499,877 (1970) and Davis U.S. Pat. No. 3,654,250 (1972).

DESCRIPTION OF THE INVENTION

The resin compositions of this invention are made by copolymerizing alpha-methylstyrene, tertiary-butylstyrene and a mono-olefin.

The resins of our invention can be produced in a variety of physical forms, ranging from hard resins of up to 400°F ring and ball softening point to low molecular weight products which are viscous liquids at room temperature. The resins having a softening point up to about 350°F have excellent solubility in a variety of aliphatic and aromatic organic solvents, those in the range of 200 to 350°F being particularly preferred. These resins are particularly suitable for use in hot melt adhesive compositions and paper coating formulations. These resins can also be used, by routine selection of the proper ratio of components, for dry cleaning sizing purposes and for other applications which will be apparent to those skilled in the art in light of our disclosure of the properties of our resins. The resins of our invention generally have Gardner colors of one or less, which makes them especially suitable for applications requiring colorless or nearly colorless compositions, such as in paper coating compositions.

The resins of our invention can be readily produced by catalytic polymerization of the aforementioned monomers with BF$_3$, BF$_3$ complexes, aluminum chloride, and similar Friedel-Crafts type acidic catalysts. This polymerization is conveniently carried out in an inert organic solvent at a temperature within the range of −60°C to 100°C. The softening points and molecular weight of the resins produced can be readily controlled by varying the temperature at which the monomer mixture is contacted with the catalyst, by varying the ratio of catalyst to monomers and by varying the ratio of monomer to solvent according to techniques known to the art. Generally lower temperatures produce resins of higher softening points and higher molecular weights. Higher temperatures produce resins of relatively lower softening points and lower molecular weights. While, at a given temperature, the higher the concentration of the reactants the lower the softening point and the higher the concentration of catalyst, the lower the softening point.

The monomers used in the production of the resins of this invention are alpha-methylstyrene, tertiary-butylstyrene and an olefin. While pure alpha-methylstyrene can be used, also suitable is the commercial mixture obtained by the dehydrogenation of cumene. Such products contain from 50 to 60 percent of the monomer. The tertiary-butyl group of the tertiary-butylstyrene can be in the 3- or 4-positions; the 4- or para isomer being preferred. The presently available 95 percent para and 5 percent meta mixture is suitable. The olefin can be a mono- or diolefin having from 2 to 12 carbon atoms including ethylene, propylene, butadiene, isoprene, 2-methyl-2-butene, and / α-dodocylene. Isoprene and 2-methyl 2-butene are particularly useful in this invention and are preferred.

The proportions of monomers to be used in the preparation of the terpolymer resins can be varied from 0.1 to 10 parts by weight of alpha-methylstyrene per part of the tertiary-butylstyrene in combination with from 0.005 to 0.5 parts per weight of olefin per part of tertiary-butylstyrene. The range of 2 to 5 parts by weight of the alpha-methylstyrene per part of the tertiary-butylstyrene in combination with from 0.01 to 0.1 parts per weight of olefin per part of tertiary-butylstyrene is preferred.

Production of our novel resins can be performed in batch or continuous operations, with the continuous process being preferred as a matter of convenience. Various inert organic solvents can be used in the polymerization processes and these provided a ready means for facilitating control of the temperatures and reaction rates of our processes. Among suitable inert organic solvents are those liquid at the temperature of reaction, such as cumene, heptanes, hexanes, toluene, xylene and the like.

Copolymerization is preferably carried out in a solution containing about 20 percent by weight of mixed monomers in an inert solvent such as cumene. If the monomers and solvent are not dry, the solution for polymerization can be dried by percolation through calcium chloride or by other means known to the art. The polymerization feed can then be cooled to a desired inlet tmperature and pumped into a tubetype reactor, the gaseous BF$_3$ being metered into the feed as it enters the reactor. Solvent and catalyst can be removed from the resin by distillation techniques well known to the art.

An area of utility which we consider has special value is the use of these resins in ethylene-vinyl acetate/petroleum wax composition.

The utilization of alpha-methylstyrene/tertiary-butylstyrene/olefin terpolmers produced as set forth above have been found to impact excellent properties of heat stability, color, odor, and performance to the ethylenevinyl acetate/petroleum wax compositions used as hot melt adhesives. Furthermore, the wide range of compatibility of the modifying agent in the blends allows choice of blends to meet the individual needs of various applications without sacrificing the major advantages. In addition, the copolymers have unexpectedly been found to have advantages over the prior art modifiers since they possess properties of easier blending, higher clarity, lower viscosity, superior heat-seal properties, and better flexibility.

Although homopolyers of alpha-methylstyrene are not particularly suited to a broad range of applications in conjunction with ethylene-vinyl acetate copolymer hot melt systems because of too little compatibility, it is recognized in the art that copolymers, particularly alpha-methylstyrene/ tertiary-butylstyrene, have been found to offer a wider selection of compatibility to suit the specific end-use requirements. Thus, increasing quantities of copolymerized tertiary-butylstyrene will result in improved wax compatibility. Typically, an alpha-methylstyrene/ tertiary-butylstyrene copolymer with monomer ratio of 2/1 respectively has a ring and ball softening point of 240°F and a cloud point (a measure of the compatibility) of about 330°F. A similarly prepared terpolymer of this invention will achieve properties at a far lower concentration of tertiary-butylstyrene. For example, an alpha-methylstyrene/tertiary-butylstyrene/2-methyl-2-butene terpolymer with a weight ratio of 3/1/.05 respectively will also have a softening point of 240°F and a cloud point of about 330°F.

The effect of the presence of the olefin on the amount of tertiary-butylstyrene required to achieve the desired wax compatibility of the resulting resin is of such magnitude that the breadth of the molecular weight distribution of the resin becomes a secondary consideration and can be readily controlled. It is known that narrowing the molecular weight distribution improves the wax compatibility of the polymer. Thus, commercially an isothermal process is usually preferred. However, for the monomer system disclosed herein, an adiabatic process, without cooling facilities, yields resins of excellent physical properties with superior wax compatibilities over a wide range of monomer concentrations. The use of the olefin imparts such flexibility to the choice of polymerization conditions that the molecular weight of the final resins can be controlled by choice of concentration of reactants even within an adiabatic process. In addition the resulting terpolymers are more heat stable and less temperature sensitive than the alpha-methylstyrene copolymers without the olefin.

Briefly, the adhesive compositions of this invention comprises an ethylene-vinyl acetate copolymer, a petroleum wax, and the alpha-methylstyrene/tertiary-butylstyrene/olefin terpolymer. Because of the wide range of compatibility, any ethylene-vinyl acetate copolymer or petroleum wax known to the art for use in hot melt compositions, may be utilized in this invention. More specifically, the compositions comprises, per 100 parts by weight of the alpha-methylstyrene terpolymer, 10 to 1200 parts of the ethylene-vinyl acetate copolymer and 10 to 1800 parts of the paraffin wax. Generally, the ethylene-vinyl acetate copolymer should comprise between 15 and 40 weight percent copolymerized vinyl acetate, advantageously between 20 and 35 weight percent and preferably between 25 and 30 weight percent. Consequently, the copolymerized ethylene content will be between 60 and 85 weight percent, advantageously between 65 and 80 weight percent and preferably between 70 and 75 weight percent. The molecular weight of the ethylene-vinyl acetate copolymer may vary over a fairly broad range since acceptable performance may be obtained by varying the molecular weight distribution in relation to the molecular weight. The molecular weight, expressed in terms of melt flow (ASTM D-1238-57T) should be less than 50, advantageously 1–30 and preferably 1–12. Such resins are well known and commercially available.

The petroleum waxes which may be used in this invention include both paraffin and microcrystalline waxes having a melting point in the range of about 125–175F and 150–200 F, respectively. Mixtures of various waxes are also suitable. A preferred class of petroleum wax is the paraffin wax, having a melting point of between 140° and 165°F.

Preparation of the compositions of this invention may be accomplished by thoroughly blending the components at an elevated temperature. The agitation or mixing may be accomplished by an conventional high shear mixer, the only requirement being that the components be thoroughly blended so as to provide a uniform composition. It is desirable that the compositions be prepared at a temperature in the range of about 300° to 350°F. This range is chosen since the ethylene-vinyl acetate copolymer becomes quite unstable above 400°F. In addition, it has been found desirable to add an antioxidant during the blending in order to allow sufficient time to blend at the temperatures indicated. Suitable antioxidants are 2,6-di-tertbutyl-p-cresol, and 4,4'-methylene-bis(2,6-di-tertbutylphenol).

Compositions of this invention may be coated by and conventional coating system for high viscosity hot melts, or if they are to be used as adhesives any conventional adhesive applicator can be utilized. It has been found particularly desirable to maintain the composition at a temperature of from 300° to 350°F when coating by means of a roll coater.

The following examples illustrate specific embodiments of my invention but should not be considered unduly limiting.

EXAMPLES I TO XI

A series of six alpha-methylstyrene/tertiary-butylstyrene/ olefin terpolymers and five alpha-methylstyrene/tertiary-butylstyrene copolymers were prepared by either batch or continuous polymerization. The data relating to the polymerization and characterization of the product are presented in Table I.

For the batch polymerization method an approximately 1000 gram sample of a 80 weight percent solvent was percolated through a bed of anhydrous $CaCl_2$ and then transferred to a three-necked flask having a stirrer and a thermocouple. The stirred solution was then cooled to below the desired initiation temperature. The cooling bath was then removed and the solution was allowed to slowly warm to the desired initiation temperature. Upon reaching the initiation temperature, $BF_3$ catalyst was added and the reaction was allowed to go to completion. During polymerization the time and temperature was monitored. Upon completion the $BF_3$ and solvent were removed by distillation with the use of nitrogen sparge at atmospheric pressure until the solution temperature reached approximately 200°C. A house vacuum ($\approx$25 torr) was used between 200°C and 245 C until devolatilization visually stopped. The remaining volatiles in the resins as measured by gas chromatography were generally less than 0.1 percent.

TABLE I

| EXAMPLES | RELATIVE PARTS BY WEIGHT | | | INITIATION TEMP. (°C) | CHANGE TEMP. T(°C) | SOLVENT | PHYSICAL PROPERTIES OF RESIN | | | | |
|---|---|---|---|---|---|---|---|---|---|---|---|
| | AMS[1] | TBS[2] | OLEFIN[3] | | | | RING & BALL[1] SOFTENING POINT | CLOUD[5] POINT | MOLECULAR WEIGHT[6] | | |
| | | | | | | | | | Mn | Mw | Mz |
| I | 3 | 1 | 0.005i | −9 | 41 | Toluene | 253 | 350 | 1079 | 2710 | 5700 |
| II | 3 | 1 | 0.05i | −9 | 37 | Toluene | 242 | 364 | 968 | 2740 | 6100 |
| III | 3 | 1 | 0.05b | −10 | 45 | Toluene | 235 | 362 | 951 | 2590 | 5900 |
| IV | 3 | 1 | 0.05b | −8 | 32 | Toluene | 243 | 322 | 951 | 2430 | 5000 |
| V | 3 | 1 | 0.05b | −10 | 25 | Toluene | 249 | 256 | 1058 | 2390 | 4600 |

TABLE I-continued

| EXAMPLES | RELATIVE PARTS BY WEIGHT | | | INITIATION TEMP. (°C) | CHANGE TEMP. T(°C) | SOLVENT | PHYSICAL PROPERTIES OF RESIN | | | | |
|---|---|---|---|---|---|---|---|---|---|---|---|
| | AMS[1] | TBS[2] | OLEFIN[3] | | | | RING & BALL[4] SOFTENING POINT | CLOUD[5] POINT | MOLECULAR WEIGHT[6] | | |
| | | | | | | | | | Mn | Mw | Mz |
| VI | 3 | 1 | 0.04i | −10 | 50 | Cumene | 234 | 332 | 913 | 1830 | — |
| VII | 2 | 1 | None | −10 | 46 | Cumene | 242 | 332 | 1089 | 2830 | — |
| VIII | 2 | 1 | None | −8 | 43 | Cumene | 239 | 334 | 929 | 2820 | 8200 |
| IX | 3 | 1 | None | −8 | 44 | Cumene | 218 | 450 | 869 | 2930 | 8600 |
| X | 3 | 1 | None | −7 | 32 | Cumene | 240 | 370 | 960 | 2730 | 9400 |
| XI | 3 | 1 | None | −7 | 33 | Cumene | 243 | 440 | 924 | 2620 | 7400 |

[1] alpha-methylstyrene
[2] tertiary butylstyrene
[3] either isoprene i or 2-methyl-2-butene b
[4] ASTM E28-51T
[5] Cloud Point of a blend of AMS/TBS copolymer/ethylene-vinyl acetate copolymer/paraffin wax in weight ratio of 100/100/300. (Elvax 260 containing 28% vinyl acetate).
[6] Gel Permeation Chromatograph For the continuous polymerization method a sample in excess of 10,000 grams of monomer/solvent feed was prepared in a manner similar to the batch runs. The feed was pumped at a rate of 60 cc per minute through a cooling coil submerged in a constant temperature bath and then through a tube reactor where it was contacted with the $BF_3$ catalyst. The solvent and catalyst removal after polymerization was similar to the previous batch experiments.

Examples I through VI are typical of the softening point and cloud point values achieved at a 3/1/0.05 ratio of alpha-methylstyrene/ tertiary-butylstyrene/olefin. These values are more closely analogous to the typical values for a 2/1 ratio of alpha-methylstyrene/tertiary-butylstyrene as seen in Example VII and VIII than the values typical of a 3/1 ratio as seen in Examples IX through XI. Thus exemplifying the ability of trace amounts of olefin to increase the wax compatibility of an alpha-methylstyrene/tertiary-butylstyrene polymer at far lower levels of tertiary-butylstyrene than previously known. Although the mechanism by which this is accomplished is not fully understood, one possible interpretation is that the presence of the trace amounts of olefin enhance the tertiary-butylstyrene ability to copolymerize with increased randomness thus decreasing the frequency of long chain homopolymer blocks of wax-incompatible poly alpha-methylstyrene.

EXAMPLE XII

The terpolymer resins of the previous examples when blended in the following formulation:

| Component | Parts by Weight |
|---|---|
| terpolymer | 100 |
| ethylene/vinyl acetate copolymer* | 100 |
| paraffin wax | 300 |
| microcrystalline wax | 167 |
| *Elvax 260 containing 28% vinyl acetate | | compare favorably with commericial alpha-methylstyrene toluene copolymer coating resins. Generally the (3/1/.05) terpolymer having a ring and ball softening point, ASTM E28-51T, of 240°F and a cloud point of 330°F will exhibit superior 60°gloss, TAPPI T653 ts-63, having an initial value as well as a value after 7 days in excess of 20. Both coefficients of friction (static and kinetic), ASTM D 1894-63, pick temperature and block temperature, TAPPI T652 05-61, are comparable. However, the seal strength, TAPPI T642 SU-64, will be superior for the terpolymer reaching values in excess of 300 b/10 cm. The moisture vapor transmission rates are similar. While the terpolymer displays excellent heat stability in that no separation occurs after 100 hours at 350°F with only slight color change.

We claim:

1. A terpolymer consisting of:
   a. one part by weight tertiary-butylstyrene;
   b. from 1 to 10 parts by weight alpha-methylstyrene; and
   c. from .005 to .5 parts by weight of olefin.

2. A terpolymer of claim 1 wherein the parts by weight of alpha-methylstyrene is from 2 to 5 and the parts by weight of olefin is from .01 to .1.

3. A terpolymer of claim 1 wherein said tertiary-butylstyrene is at least 90 percent the para isomer.

4. A terpolymer of claim 1 wherein the olefin is isoprene.

5. A terpolymer of claim 1 wherein the olefin in 2-methyl-2-butene.

6. A terpolymer of claim 1 having a ring and ball softening point of 200°to 350°F.

7. A composition comprising the terpolymer of claim 6 and, per 100 parts by weight of said terpolymer, 10 to 1200 parts of an ethylene-vinyl acetate copolymer having a vinyl acetate content within the range of 10 to 50 mole percent, and 10 to 1800 parts of a paraffin wax having a melting point of 125°to 200°F.

8. The composition of claim 7 containing, per 100 parts by weight of said terpolymer 100 parts of said ethylene-vinyl acetate copolymer and 300 parts of said paraffin wax.

9. A terpolymer of claim 1 wherein the parts by weight of alpha-methylstyrene is about 3 and the parts by weights of olefin is about 0.05.

* * * * *

UNITED STATES PATENT OFFICE
CERTIFICATE OF CORRECTION

PATENT NO. : 3,903,060
DATED : September 2, 1975
INVENTOR(S) : Michael G. Henk and Gary P. Sartler It is certified that error appears in the above-identified patent and that said Letters Patent are hereby corrected as shown below:

ASSIGNEE: "The Standard Oil Company" should be "Standard Oil Company"

COLUMN 4, line 2, "125-175F and 150-200F," should be --125-175°F and 150-200°F,--

COLUMN 4, line 55, "245C" should be -- 245°C --

TABLE I
under column labeled
"OLEFIN", Example 1, "0.005i" should be -- 0.05i --

TABLE I, Footnote 3, "either isoprene i or 2-methyl-2-butene b" should be -- either isoprene (i) or 2-methyl-2-butene (b) --

COLUMN 5, line 57-58, "commericial alpha-methylstyrene toluene copolymer" should be -- commercial alpha-methylstyrene/vinyl toluene copolymer --

Signed and Sealed this twenty-fourth Day of February 1976

[SEAL]

Attest:

RUTH C. MASON
Attesting Officer

C. MARSHALL DANN
Commissioner of Patents and Trademarks